INVENTOR
Winthrop M. Leeds

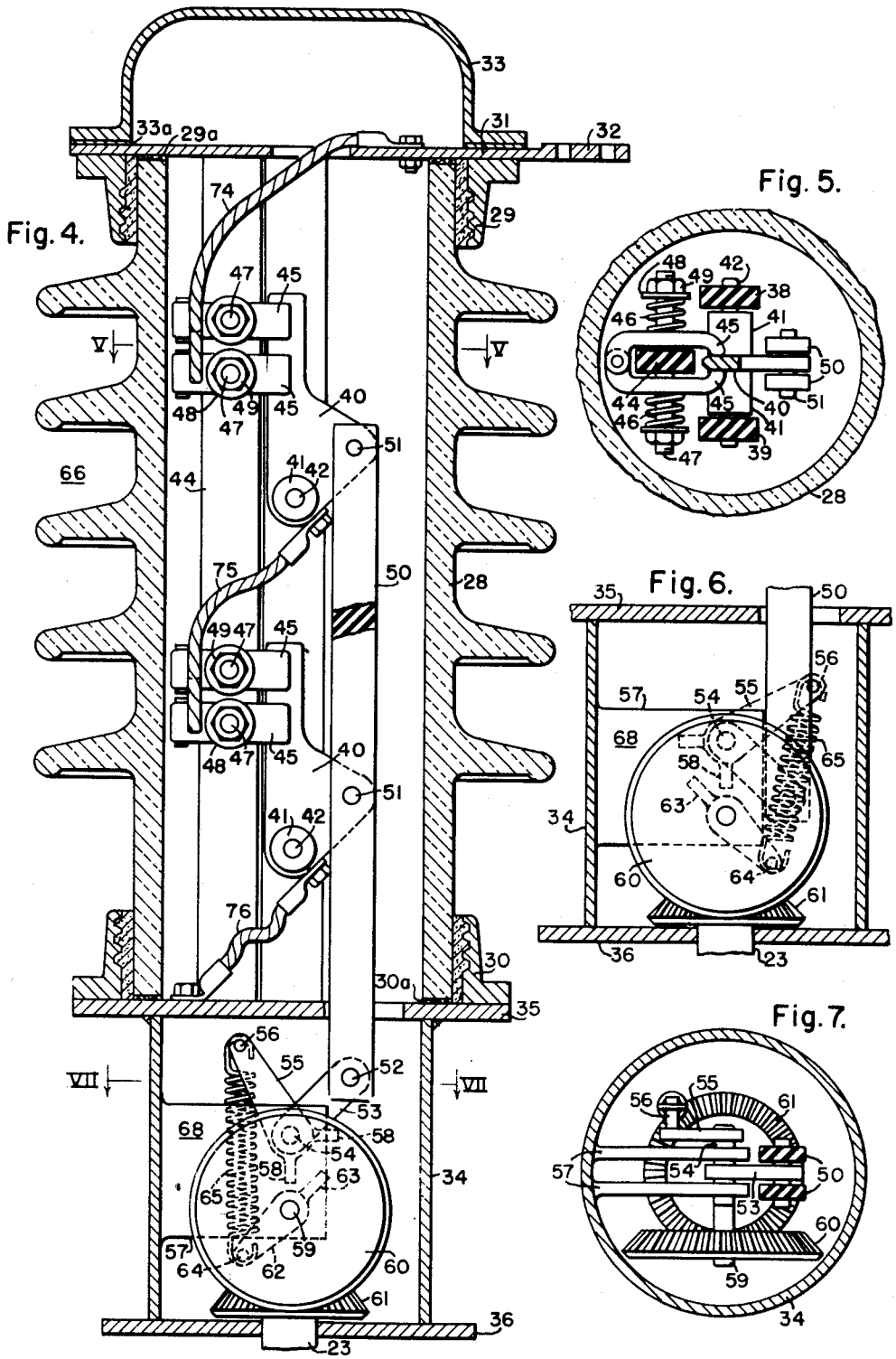

United States Patent Office 2,942,085
Patented June 21, 1960

2,942,085

CIRCUIT INTERRUPTER

Winthrop M. Leeds, Forest Hills, Pa., assignor to Westinghouse Electric Corporation, East Pittsburgh, Pa., a corporation of Pennsylvania Filed June 8, 1956, Ser. No. 590,138

11 Claims. (Cl. 200—145)

This invention relates to circuit interrupters in general, and, more particularly, to interrupting switches, which may, in certain applications, serve for switching capacitor banks or for opening load currents.

High-voltage distribution systems through thinly settled regions frequently have to deliver small isolated blocks of power, which has, in the past, necessitated the uneconomical use of expensive protective equipment consisting of high kva. circuit breakers and disconnecting switches.

It is a general object of the present invention to provide an improved relatively low kva., especially constructed power circuit breaker in combination with a disconnecting switch. The functions of switching and disconnecting are all controlled by one operating means, which may be manually operated, or motor operated with either manual or automatic control in response to the occurrence of predetermined conditions.

A more specific object of the invention is to provide an improved disconnecting type of capacitor switch, which may be used for handling capacitor switching duty without restrikes. The increasing use of large static capacitor banks at voltages from 15 kv. to 115 kv. has brought about a demand for disconnecting switches capable of handling such capacitor switching duty. The ordinary plain-break disconnecting switch cannot perform this capacitor switching duty satisfactorily. The present invention covers a solution to the problem by providing an improved disconnecting type of capacitor switch.

A more specific object of the invention is to provide an improved operating arrangement for a circuit interrupter which will rapidly effect contact separation.

Another object of the invention is to provide an improved, relatively low-power interrupting switch, that is, a disconnecting switch in combination with a low-power interrupting device, in which the actuation of the operating parts is sequentially controlled in a proper manner. Preferably the speed of separation of the interrupting contacts, between which the arcing occurs and is extinguished, is independent of the speed of operation of the operating mechanism for the switch.

Yet a further object of the invention is the provision of an improved interrupting switch in which a plurality of serially-connected breaks establish a plurality of serially-connected arcs within a gas-filled chamber.

Further objects and advantages will readily become apparent upon reading the following specification, taken in conjunction with the drawings, in which:

Fig. 4 is a vertical sectional view through the improved circuit breaker, the contact structure and the operating mechanism being shown in the closed-circuit position;

Fig. 5 is a sectional view taken substantially along the line V—V of Fig. 4;

Fig. 6 is a fragmentary, vertical sectional view showing the operating mechanism in the fully open-circuit position; and, Fig. 7 is a plan view, in section, taken substantially along the line VII—VII of Fig. 4.

Figure 1:
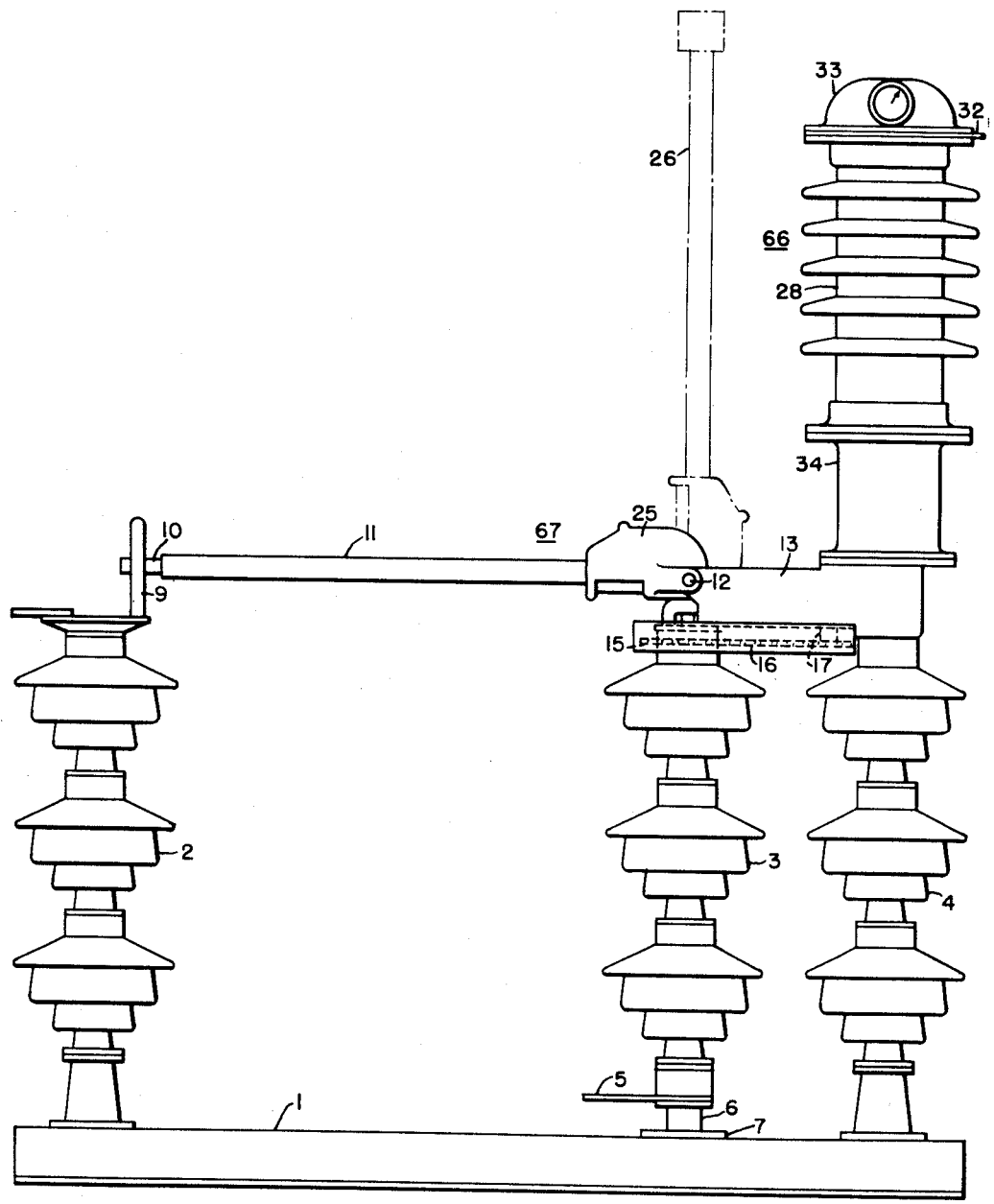
Figure 1 is a side elevational view of the improved circuit interrupter of the present invention, the contact structure being shown by the full lines in the closed-circuit position.

Referring to the drawings, and more particularly to Fig. 1 thereof, the reference numeral 1 designates a frame support, which may be of channel-shaped configuration. Extending upwardly from the frame support 1 are three stacks of insulators 2–4, the end stacks 2 and 4 being stationary, and the middle insulator stack 3 being rotatable. Preferably a crank arm 5 is attached to the lower end of the insulator stack 3. The crank arm 5 may be rotated either manually or by a suitable motor-driven mechanism. The rotatable insulator stack 3 is mounted upon a vertical shaft 6, which is journalled within a suitable bearing 7, fixedly supported to the frame support 1.

The end insulator stack 2 fixedly supports a pair of stationary jaw contacts 9, which, in the closed-circuit position of the interrupter, as shown in Fig. 1, electrically engage the end 10 of a disconnecting switch blade 11. The disconnecting switch blade 11 is pivotally mounted about pivot pins 12 supported upon a mechanism housing 13. The mechanism housing 13 is supported by the upper end of the rotatable insulator stack 3 and also by the stationary insulator stack 4.

Figure 3:
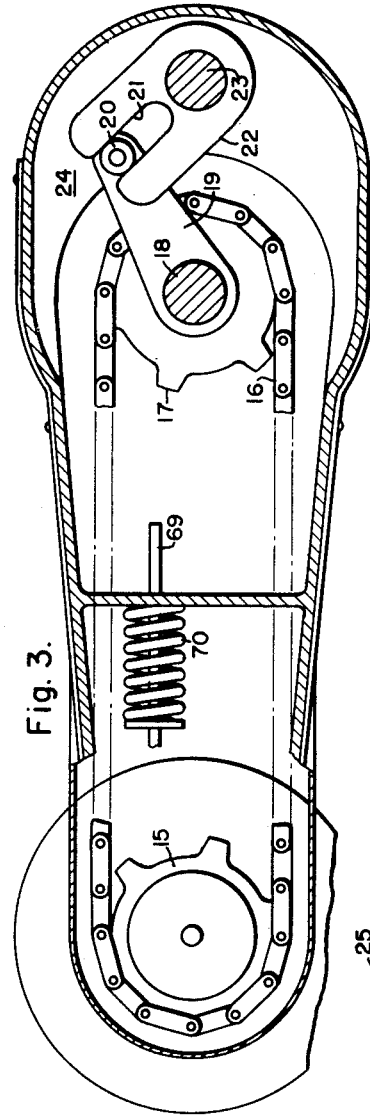
Fig. 3 is a plan view, partially in section, of the mechanism disclosed in Fig. 2.

Fixed to the upper end of the rotatable insulator stack 3 is a sprocket wheel 15, more clearly shown in Fig. 3, which engages a chain drive 16, which in turn engages a second sprocket wheel 17 associated with the upper end of the stationary insulator stack 4. The sprocket wheel 17 is fixed to a shaft 18, which carries an arm 19 having a roller 20 at its outer end. The arm 19 and roller 20 constitute a Geneva-gear driver. The roller, or Geneva-gear driver 20 is adapted to move within a slot 21 between a pair of adjacent teeth associated with a Geneva gear or bifurcated arm 22, which is fixed to the lower end of an operating shaft 23. It will thus be apparent that the Geneva gear is utilized to give an intermittent drive to effect the snap-opening of the interrupting contacts, as hereinafter described.

Operation of the crank arm 5 to effect rotation of the rotatable insulator stack 3 not only effects the operation of the Geneva gear mechanism 24, as described hereinbefore, but also effects, through suitable mechanism, forming per se no part of the present invention, disposed within the cam housing 25, twisting motion of the switch blade 11 followed by upward swinging opening motion of the switch blade 11 to the open-circuit position thereof, indicated by the dotted lines 26 of Fig. 1.

The mechanism disposed within the cam housing 25 is preferably of the type set out and claimed in U.S. Patent 2,436,296, issued February 17, 1948, and assigned to the assignee of the instant application. Reference may be had to the aforesaid patent for a complete description of such mechanism, and for a full understanding of its operation. Preferably, this mechanism, set out in the aforesaid patent, first causes an axial rotation, or twisting, of the switch blade 11 to release the high contact pressure at contact 9 and to break any ice formation between the contacts 9 and 10, and then subsequently, following such axial rotation of the switch blade 11, this mechanism functions to swing the switch blade 11 upwardly to the dot-dash position 26 of Fig. 1. Consequently, the position 26 of Fig. 1 illustrates the fully open-circuit position of the interrupter. The closing operation goes through the same sequence in reverse order.

Referring to Fig. 4 of the drawings, it will be noted that there is provided a casing 28 of a suitable weatherproof material, such as porcelain or the like. The casing 28 has a pair of flange supports 29, 30 cemented to its upper and lower ends. The upper flange support 29 is suitably bolted to a terminal plate 31 having a terminal pad 32, to which a line connection may be made. Disposed immediately above the terminal plate 31 is a casting cap 33, which encloses the upper end of the casing 28. The lower flange support 30 is fixedly secured to a mechanism housing 34, which includes an upper metallic plate 35 and a lower metallic plate 36, through which upwardly extends the operating shaft 23.

Figure 2:
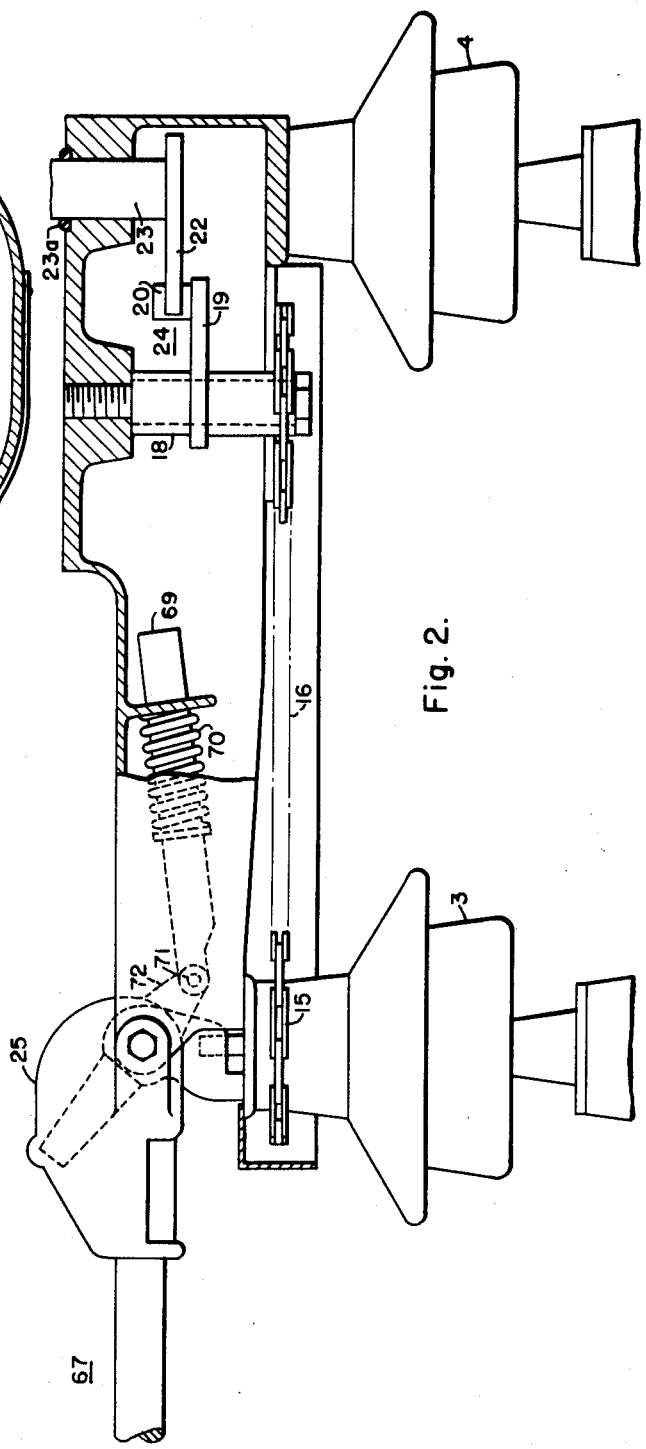
Fig. 2 is a fragmentary, enlarged, side elevational view, partially in section, of a portion of the operating mechanism, which actuates the circuit interrupter and which also operates the mechanism for the disconnecting switch, the contact structure being shown in the closed-circuit position.

The casing 28 is adapted to be filled with an arc-extinguishing gas, such as sulphur hexafluoride, the remarkable arc-extinguishing characteristics of which are set out in U.S. patent application filed July 19, 1951, Serial No. 237,502, issued July 31, 1956 as United States Patent 2,757,261 to Harry J. Lingal, Thomas E. Browne, Jr. and Albert P. Strom, and assigned to the assignee of the instant application. The gas instead of being $SF_6$, may be selenium hexaflouride ($SeF_6$), which gas is described and claimed in United States Patent 2,733,316, issued January 31, 1956, to Thomas E. Browne, Jr., Albert P. Strom and Harvey E. Spindle and assigned to the assignee of the instant application, or mixtures of those gases with each other, or with inert gases, such, for example, as helium, carbon dioxide, air, nitrogen and argon. Suitable gaskets 29a, 30a may be employed, as shown in Fig. 4 to prevent leakage of the enclosed gas. A gasket 33a may be provided for the cap 33. A resilient ring seal 23a (Fig. 2) may be provided to prevent leakage of gas downwardly along the shaft 23.

Pivotally supported within the casing 28 on a pair of upstanding insulating second support rods 38, 39 (Fig. 5) are a plurality of rotatable movable contact members 40. The movable contact members 40 have hub portions 41, through which extend pivot pins 42, the latter being journalled within the support rods 38, 39. The upper and lower ends of the support rods 38, 39 may be affixed, in any suitable manner, to the upper terminal plate 31 and to the lower plate 35.

Also extending longitudinally within the casing 28 is another insulating first support rod 44, which resiliently supports a plurality of pairs of stationary contact fingers 45, having associated therewith biasing springs 46 encircling spring guide rods 47. The guide rods 47 preferably extend laterally through the support rod 44 and have washers 48 and nuts 49 at their outer ends for controlling the contact pressure exerted by the compression springs 46. Thus, the contact fingers 45 are biased inwardly against the movable contacts 40 to effect good contacting engagement therebetween.

To effect opening and closing rotation of the movable contact members 40 about their pivot axes 42 there are provided vertically extending operating third rods 50, composed of insulating material, and having pivot connections, as at 51, to the movable contact members 40. The lower ends of the insulating operating rods 50 are pivotally connected, as at 52, to a crank arm 53, the latter being rotatable about a shaft 54 and rigidly secured thereto. One end of the shaft 54 has an arm 55 with a spring support 56 (Fig. 7) at the outer free end thereof. The other end of the shaft 54 is journalled within one of two laterally extending support plates 57, which may be an integral part of the casting constituting the cylinder mechanism housing 34. It is to be noted that the arm 55 has actuating lugs or dogs 58 integrally formed therewith, as more clearly shown in Fig. 4 of the drawings, the purpose for which will be explained hereinafter.

A second horizontally extending drive shaft 59, supported by the support plates 57, has secured to one end thereof a bevel gear 60. The bevel gear 60 meshes with a second bevel gear 61, which is secured to the upper end of the operating shaft 23. The end of the drive shaft 59, opposite the bevel gear 60, has fixedly secured thereto a crank arm 62 having integrally formed therewith a dog 63, or a push rod, which engages during the opening operation one dog 58 integrally formed with the arm 55. During closing it engages the other dog 58.

The outer free end of the crank arm 62 has a spring support 64, to which is fastened one end of a coiled tension spring 65, the other end of which is secured to the spring support 56. Flexible connectors 74—76 connect the several pairs of contacts in series.

From the foregoing description it will be apparent that rotation of the crank arm 5, by any suitable means, will effect corresponding rotation of the insulator stack 3 and rotative movement of the sprocket wheel 15. Through the chain drive 16 the sprocket wheel 17 is rotated to effect through the Geneva gear mechanism 24 corresponding rotation of the vertically extending drive shaft 23. The rotation of the drive shaft 23 will, through the meshing of the bevel gears 60, 61, effect counterclockwise rotative motion of the drive shaft 59, as viewed in Fig. 7. This will cause engagement between the push rod 63 and one dog 58 to effect thereby positive rotation of the shaft 54 and hence positive opening movement of the operating rods 50 and the movable contacts 40. This positive engagement may be necessary since there may be considerable friction present between the pairs of spring-biased stationary contact fingers 45 and the movable contact members 40. Such relatively high contact pressure may be necessary to insure the passage through the contacts of considerable current, since it will be obvious that the interrupting structure 66 is always in series circuit with the disconnecting contact structure 67. As a result, there is provided positive opening movement of the movable contacts 40 regardless of any frictional force existing between the contacts 40, 45.

It will be observed moreover that the counterclockwise rotative motion of the drive shaft 59 will carry the spring support 64 over center, so that the tension spring 65 will effect snap-opening movement of the operating rods 50 and hence snap-opening of the movable contacts 40. Fig. 6 shows the positions of the several parts of the operating mechanism 68 in the fully open-circuit position.

It will be obvious that the separation between the movable contacts 40 and the stationary contacts 45 within the gas-filled casing 28 will effect rapid extinction of the serially related arcs drawn therewithin. This all occurs prior to the separation between the end 10 of the disconnecting switch blade 11 and the stationary jaw contacts 9, the latter being designed to have purely an isolating function.

To compensate for the weight of the disconnecting switch blade, a spring-biasing rod 69 (Fig. 2) may be provided, which is spring-biased by a spring 70 in a direction to compensate for the weight of the disconnecting switch blade 11. The biasing rod 69 may be pivotally connected, as at 71, to a boss portion 72, which is integrally formed with the rotatable cam housing 25.

As mentioned hereinbefore, the mechanism 68 functions to insure separation between the contacts 40, 45 and extinction of the several arcs prior to separation between the disconnecting contacts 9, 10. Following the extinguishment of the arcs, however, the disconnecting contact structure 67 functions in the usual manner to swing the disconnecting switch blade 11 to the upstanding vertical position, indicated by the dot-dash lines 26 of Fig. 1, this motion being assisted by the biasing action exerted by the compression spring 70 (Fig. 3).

During the closing operation the crank arm 5 is rotated in the opposite direction, and this effects through the rotation of the insulator stack 3 reverse or counterclockwise rotation of the sprocket wheels 15, 17, as viewed in Fig. 3. This will cause operation of the Geneva gear mechanism 24 and clockwise rotation of the vertically extending drive shaft 23, as viewed in Fig. 3.

Clockwise rotation of the bevel gear 60 will then be caused, as viewed in Fig. 6, to carry the spring support 64 over center, thus permitting the tension spring 65 to effect snap counterclockwise rotation of the arm 55 and hence snap-closing motion of the several movable contacts 40 with the stationary contacts 45. The push rod 63 will engage the closing dog 58 to assist in the over-center action. This closing of the contacts 40, 45 preferably occurs following reengagement of the disconnecting contacts 9, 10, but the time of reengagement of the disconnecting contacts 9, 10 may coincide with the time of engagement of the several contacts 40, 45.

From the foregoing description it will be apparent that there is provided an improved interrupting, or capacitor switch, which consists of a gas-filled interrupting structure 66. If $SF_6$ is used, the gas pressure is preferably about 30 pounds per square inch. It will be noted that the multi-break, porcelain clad interrupting structure 66 is preferably connected electrically in series with the disconnecting switch blade structure 67. By means of a chain and sprocket drive between the rotating porcelain column 3 and the operating shaft 23 of the interrupter assembly 66 driving energy is transferred. The Geneva gear mechanism 24 is used to give an intermittent drive, and arranged to snap open the movable interrupting contacts 40 while the disconnecting switch blade 11 rotates or twists in its jaws 9 but before the switch blade 11 swings upwardly.

Substantial fingers 45 are used to provide a continuous current-carrying ability of 400 to 800 amperes or more, as well as short time and momentary capacity of 20,000 to 40,000 amperes. Rotation of the operating shaft 59 swings the lower end of the accelerating spring 65 over center, allowing the bell crank 53 to pull the operating rods 50 downwardly and hence snap the movable contacts 40 to the open-circuit position. The push rod 63 makes sure that the contacts 40 do not hold up in the fingers 45. Reverse rotation of the drive shaft 59 moves the accelerating spring 65 back and snaps the movable contacts 40 closed.

It will be apparent that the disclosed interrupting switch is high speed in operation and highly effective in extinguishing the several arcs. The disconnecting structure 67 insures an adequate isolating gap, and provides a visual indication that the interrupting switch is open. The closing operation, as well as the opening operation, is high speed because of the use of the accelerating tension spring 65.

Although there has been shown and described a specific structure, it is to be clearly understood that the same was merely for the purpose of illustration, and that changes and modifications may readily be made therein by those skilled in the art without departing from the spirit and scope of the invention.

I claim as my invention:

1. The combination in a circuit interrupter of a plurality of relatively stationary contacts, elongated support means for supporting said plurality of relatively stationary contacts in spaced relation, a plurality of relatively movable contacts, means supporting said plurality of relatively movable contacts for rotative motion, means electrically connecting the several contacts in series, an operating rod pivotally connected to each of said plurality of movable contacts, a rotatable shaft, means connecting said operating rod with the shaft so that said operating rod may be oscillated longitudinally to effect contact engagement and disengagement, an arm fixedly secured at one end to said shaft, over-center spring means connected to the other free end of said arm for effecting opening and closing rotative motion of the shaft, a push lug associated with said shaft, and means for engaging said push lug at the start of the opening stroke to positively effect separation of the contacts.

2. The combination in an interrupting switch of a disconnecting switch having a swingable disconnecting switch blade and a serially related upstanding interrupting unit, said interrupting unit including a plurality of relatively stationary contacts spaced axially along the upstanding interrupting unit, a plurality of relatively movable contacts cooperable with the relatively stationary contacts, means electrically connecting said contacts in series, rotatable operating means for effecting both opening swinging movement of the disconnecting switch blade and separation of the serially related contacts within said interrupting unit, said operating means including a pair of parallel disposed shafts, each shaft having a crankarm associated therewith, and a tension spring connected between the free ends of the crankarms.

3. The combination in an interrupting switch of a disconnecting switch having a swingable disconnecting switch blade and a serially related upstanding interrupting unit, said interrupting unit including a plurality of relatively stationary contacts spaced axially along the upstanding interrupting unit, a plurality of relatively movable contacts cooperable with the relatively stationary contacts, means electrically connecting said contacts in series, rotatable operating means for effecting both opening swinging movement of the disconnecting switch blade and separation of the serially related contacts within said interrupting unit, said operating means including a pair of parallel disposed shafts, each shaft having a crankarm associated therewith, a tension spring connected between the free ends of the crankarms, an operating rod connected to the movable contacts, and means connecting said operating rod with one of said shafts.

4. The combination in an interrupting switch of a disconnecting switch having a swingable disconnecting switch blade and a serially related upstanding interrupting unit, said interrupting unit including a plurality of relatively stationary contacts spaced axially along the upstanding interrupting unit, a plurality of relatively movable contacts cooperable with the relatively stationary contacts, means electrically connecting said contacts in series, rotatable operating means for effecting both opening swinging movement of the disconnecting switch blade and separation of the serially related contacts within said interrupting unit, said operating means including a pair of parallel disposed shafts, each shaft having a crankarm associated therewith, a tension spring connected between the free ends of the crankarms, an operating rod connected to the movable contacts, means connecting said operating rod with one of said shafts, and push dogs associated with said shafts to effect positive opening motion of the movable contacts away from the relatively stationary contacts.

5. An interrupting switch including a disconnecting switch and a serially related interrupting unit, separable contact structure associated with said interrupting unit, a movable disconnecting switch blade, means including a Geneva gear and over-center spring means for effecting opening and closing operations of said separable contact structure, a common rotatable driving means for operating said switch blade and said separable contact structure, said common rotatable driving means including a Geneva-gear driver, and said common rotatable driving means being operable during the opening and closing operations of the interrupting switch to effect intermittent driving meshing engagement of said Geneva-gear driver with said Geneva gear to effect corresponding separation and engagement of the contact structure of the interrupting unit.

6. The combination in an interrupting switch including a disconnecting switch and a serially related interrupting unit of common rotatable driving means for effecting simultaneous operation of said disconnecting switch and said interrupting unit, said common rotatable driving means including a Geneva-gear driver, a Geneva gear disposed adjacent one end of said interrupting unit, a plurality of axially spaced stationary contacts disposed along said interrupting unit, a plurality of cooperable movable contacts spaced axially along said interrupting unit, means connecting said contacts electrically in series, a longitudinally extending insulating operating rod disposed longitudinally within said interrupting unit, means operatively connecting said longitudinally extending insulating operating rod with said plurality of movable contacts, means including over-center spring means operatively connecting said Geneva gear to one end of said insulating operating rod, and said common rotatable driving means being operable during the opening and closing operations of the interrupting switch to effect intermittent driving meshing engagement of said Geneva-gear driver with said Geneva gear to effect thereby motion of said insulating operating rod and consequent opening and closing of the plurality of contacts within said interrupting unit.

7. The combination in an interrupting switch including a disconnecting switch and a serially related interrupting unit of common rotatable driving means for effecting simultaneous operation of said disconnecting switch and said interrupting unit, said common rotatable driving means including a Geneva-gear driver, a Geneva gear disposed adjacent one end of said interrupting unit, a plurality of axially spaced stationary contacts disposed along said interrupting unit, a plurality of cooperable movable contacts spaced axially along said interrupting unit, means connecting said contacts electrically in series, a longitudinally extending insulating operating rod disposed longitudinally within said interrupting unit, means operatively connecting said longitudinally extending insulating operating rod with said plurality of movable contacts, over-center spring means operatively connecting said Geneva gear to one end of said insulating operating rod, and said common rotatable driving means being operable during the opening and closing operations of the interrupting switch to effect intermittent driving meshing engagement of said Geneva-gear driver with said Geneva gear to operate the over-center spring means to effect thereby motion of said insulating operating rod and consequent opening and closing of the plurality of contacts within said interrupting unit.

8. An interrupting switch including a disconnecting switch and a serially related interrupting unit, separable contact structure associated with said interrupting unit, operating means for effecting opening and closing of said separable contact structure, a Geneva gear, over-center spring means interconnecting said operating means with said Geneva gear, a movable disconnecting switch blade, a common rotatable driving means for operating said switch blade and said separable contact structure, said common rotatable driving means including a Geneva-gear driver, and said common rotatable driving means being operable during the opening and closing operations of the interrupting switch to effect intermittent driving meshing engagement of said Geneva-gear driver with said Geneva gear to operate the over-center spring means to effect corresponding separation and engagement of the contact structure of the interrupting unit.

9. An interrupting switch including a disconnecting switch and an upstanding interrupting unit, insulating means for supporting said disconnecting switch and said upstanding interrupting unit up in the air above ground potential, said disconnecting switch including a movable disconnecting switch blade, a line terminal at the upper end of said upstanding interrupting unit, separable contact structure disposed within said upstanding interrupting unit, a Geneva gear disposed adjacent the lower end of said interrupting unit, connecting means including an over-center spring for connecting said Geneva gear with said separable contact structure, a common rotatable driving means for operating said switch blade and said separable contact structure, said common rotatable driving means including a Geneva-gear driver, and said common rotatable driving means being operable during the opening and closing operations of the interrupting switch to effect intermittent driving meshing engagement of said Geneva-gear driver with said Geneva gear to operate the over-center spring means to effect corresponding separation and engagement of the contact structure of the interrupting unit.

10. An interrupting switch including a disconnecting switch and an upstanding interrupting unit, insulating means for supporting said disconnecting switch and said upstanding interrupting unit up in the air above ground potential, said disconnecting switch including a movable disconnecting switch blade, a line terminal at the upper end of said upstanding interrupting unit, separable contact structure disposed within said upstanding interrupting unit, said upstanding interrupting unit including an upstanding, hollow insulating casing, insulating supporting means extending longitudinally within said hollow casing, said separable contact structure including a plurality of axially spaced relatively stationary contacts supported from the inner wall of said hollow casing by said longitudinally extending insulating supporting means, a Geneva gear disposed adjacent the lower end of said interrupting unit, connecting means including an over-center spring for connecting said Geneva gear with said separable contact structure, a common rotatable driving means for operating said switch blade and said separable contact structure, said common rotatable drying means including a Geneva-gear driver, and said common rotatable driving means being operable during the opening and closing operations of the interrupting switch to effect intermittent driving meshing engagement of said Geneva-gear driver with said Geneva gear to operate the over-center spring means to effect corresponding separation and engagement of the contact structure of the interrupting unit.

11. An interrupting unit including an elongated hollow insulating casing, a stationary insulating support rod spaced from the inner wall of said hollow casing and supporting a plurality of axially spaced relatively stationary contacts, a second stationary support rod, a plurality of axially spaced movable contacts respectively cooperating with said plurality of relatively stationary contacts, means pivotally mounting said plurality of movable contacts to said second stationary support rod, a third insulating rod reciprocally movable longitudinally within said hollow casing and pivotally connected to each of said movable contacts, and means for effecting the longitudinal reciprocating motion of said third insulating rod to effect thereby simultaneous opening and closing of the contacts.

References Cited in the file of this patent

UNITED STATES PATENTS

| | | |
|---|---|---|
| 442,404 | Steiger | Dec. 9, 1890 |
| 1,224,652 | Kocourek | May 1, 1917 |
| 1,356,915 | Fisher | Oct. 26, 1920 |
| 1,458,090 | Waldron | June 5, 1923 |
| 2,023,486 | McComb | Dec. 10, 1935 |
| 2,071,185 | Thumim | Feb. 16, 1937 |
| 2,098,801 | Erben | Nov. 9, 1937 |
| 2,428,597 | Van Sickle et al. | Oct. 7, 1947 |
| 2,467,788 | Van Sickle | Apr. 19, 1949 |
| 2,470,604 | Cumming | May 17, 1949 |
| 2,568,008 | Jansson | Sept. 18, 1951 |
| 2,675,505 | Flurscheim et al. | Apr. 13, 1954 |
| 2,680,164 | Lennox | June 1, 1954 |
| 2,737,556 | MacNeill et al. | Mar. 6, 1956 |